COLOR TELEVISION SYSTEM AND DISPLAY THEREFOR

Filed Sept. 17, 1954 2 Sheets-Sheet 1

SIDNEY LEVY
*INVENTOR.*

BY Abraham Friedman
Atty.

COLOR TELEVISION SYSTEM AND DISPLAY THEREFOR

Filed Sept. 17, 1954 2 Sheets-Sheet 2

INVENTOR.
SIDNEY LEVY
BY Abraham Friedman
Atty.

2,714,175
Patented July 26, 1955

2,714,175

COLOR TELEVISION SYSTEM AND DISPLAY THEREFOR

Sidney Levy, Garden City, N. Y.

Application September 17, 1954, Serial No. 456,823
7 Claims. (Cl. 313—92)

This invention relates to a color television display system and cathode ray display tube therefor.

A variety of methods have been proposed and developed for transmission, reception and display of color television images. The color television system currently favored by substantial portion of the industry conforms to standards adopted by the National Television System Committee. This system calls for the transmission of a luminence signal which carries information pertaining to the brightness and detail of the image and a chrominance signal which carries the information as to variations in the hue and saturation of the various color portions of the image. The chrominance signal as it is developed at the output of the color television receiver simultaneously represents the values of hue and saturation for each of three primary colors at the particular image area being scanned. In accordance with these standards the primary colors employed are red, blue and green, although it will be understood that any three colors may be employed provided they are spectrally widely separated in the I. C. I. color triangle and no two of them can be added together to produce the third and the three added together produce white. The instant invention is applicable to a color television system of this character although it will be understood that it is equally applicable to many of the other proposed systems, such as dot, line or frame sequential systems.

It has been proposed to display the television image signal by means of a cathode ray tube using one or three electron guns directed at a target screen comprising principally discrete sensitized areas bearing luminescent, fluorescent or phosphorescent phosphor materials which are capable of emitting the desired color component elements such as red, green and blue. These sensitized areas may assume a variety of configurations such as dots, lines, pyramids and various combinations of them. Arrangements have also been proposed to provide means for scanning the target screen in accordance with the scan of the transmitted image, and for modulating, controlling and orienting the electron beam to produce the desired luminous color and to limit the impingement thereof to the desired sensitized area. The electron beam or beams may be caused to scan the three primary color areas either in sequence or simultaneously so that the luminosity of the three color values are additive to the eye to thereby reproduce the hue and saturation of the particular color signal or to produce black or white image areas. Numerous systems and structures have been proposed to control and modulate the electron beam so as to thereby produce the desired scansion of the sensitized areas and to prevent the impingement of the electron beam, or any portion thereof, upon undesired color sensitized areas.

The display arrangements proposed include deflecting grid and masking arrangements which are designed to limit the impingement of the beam to the desired primary color area.

In general the instant invention comprises a system whereby a single gun tube is utilized to direct an electron beam toward a target screen. The target screen is comprised of a foundation mosaic formed of grids comprising interlaced lines or strips of transparent conductive or narrow conductive metal material suitably interconnected and deposited upon a plate which may be the face of the cathode ray tube. Deposited upon the grid lines and strips of conductive material are phosphorescent materials arranged in grid groups so that each group includes at least one member of each of the primary colors referred to above. The conductive grid additionally includes a common connection for each family of colors, which common connection is passed through the tube envelope, and provides means for connecting the output of each of the three color signals developed in the color receiver. The electron beam is focused and directed toward at least one group of lines. Upon the application of the potentials derived from the chrominance amplifiers to the conductive layer underlying each of the lines of color phosphor respectively the electron beam is caused to be deflected and divided in proportion to the color intensity of each of the primary colors contained in the particular shade of color being transmitted. Thus, a single electron beam is caused to simultaneously produce the desired combination of the three primary colors eliminating the necessity of accurate registration of the beam as well as cumbersome, complex and critical tube components heretofore required. Furthermore, the arrangement of the target screen is such that it may be readily incorporated in standard commercial cathode ray envelopes and may be readily deposited on the interior surface of the tube face or upon an independent plate mounted therein. Furthermore, the arrangement is such that the red phosphor color area is substantially twice that of the phosphor area of either of the other colors thereby compensating for the comparative inefficiency of emission of red phosphor materials.

Accordingly it is an object of this invention to provide a color television display system wherein the luminous color emission characteristics of the cathode ray display device may be readily varied in accordance with the received color information over the entire screen area and thereby eliminating the necessity of accurate registration of an electron beam with any particular color area.

It is a further object of this invention to provide a color television display system wherein a single gun cathode ray tube may be employed to scan a target screen and wherein the electron beam is capable of being simultaneously deflected to component color areas in proportion to the degree of saturation of each component primary color by means of control potentials applied to the target screen.

It is also an object of this invention to provide a color screen arrangement for a cathode ray tube utilizing a single gun which may be readily and efficiently manufactured by presently known and available methods and without the use of cumbersome, complex or critical tube components or parts.

Among the other objects of this invention is to provide a target screen arrangement which may be readily, efficiently and economically produced and wherein the red phosphor area is substantially twice that of the blue and green phosphor areas without any substantial loss of resolution and wherein electrical connections may be made to various color screen areas without cross-overs.

Other and further objects, benefits and advantages of this invention will become apparent from the description thereof contained in the annexed drawings, specifications and claims or will otherwise become obvious. It will be understood that the invention herein disclosed may be employed for other purposes for which the parts, structure and arrangement are adapted.

Figure 1:
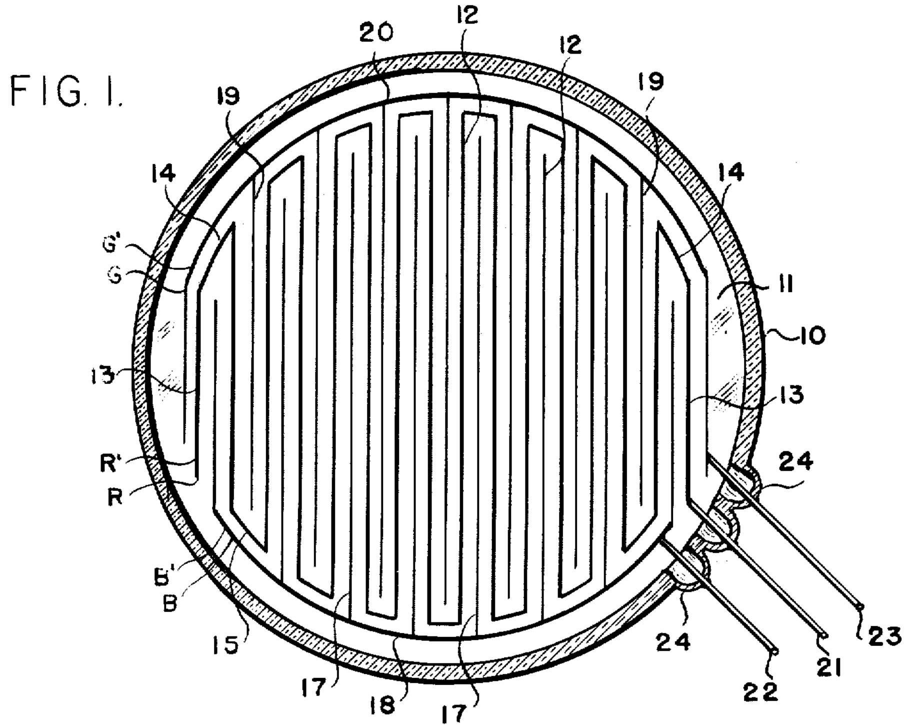
Figure 1 is a cross-section of a cathode ray tube showing the arrangement of the screen pattern as viewed from the tube interior.

Referring to the drawings, Figure 1 illustrates the forward section of the evacuated envelope 10 of a single gun cathode ray tube. For convenience of illustration the neck portion of the tube is not shown since such portion may in all respects be conventional and is well described in the patented art and other literature. The neck portion of a cathode ray tube of this character normally includes an indirectly heated cathode as well as anode and control electrode structures. Deflection electrodes may be included within the tube envelope or may comprise coils or magnetic structures for focusing, deflecting and otherwise orienting the electron beam produced within the tube. As is conventional in monochrome or black and white television cathode ray tubes, the electron beam is caused to scan or trace a suitable raster at the forward end of the cathode ray tube. The transparent tube face may be circular or rectangular and the envelope may be glass or metal. Illustratively, the raster in accordance with the current standards of the National Television System Committee call for a raster wherein the scanning frequencies are set at 15,734.264 cycles per second horizontally and 59.94 cycles per second vertically for color image reception to produce a 525 line interlaced raster pattern. It will be understood that the instant invention is applicable to any other suitable raster scanning frequencies. Within the tube envelope, the electron beam is directed toward the front face or window thereof and is thus caused to scan across the tube window area in a series of horizontal lines in spaced relation. In the conventional cathode ray tube used in monochrome or black and white television reception the interior surface of the tube face or window is coated with a sensitive material such as a phosphor which is caused to emit light upon the impingement of the electron beam thereon.

In accordance with the present invention the sensitized screen may be formed on the interior surface of the cathode ray tube face or window 11 or an independent transparent plate may be mounted in the envelope upon which a mosaic pattern in accordance with the present invention is deposited and formed. In referring to the face or window of the tube, it will be understood that an independent transparent supporting plate mounted thereon is intended to be included although certain economies and advantages may be realized by the direct deposition of the target screen pattern arrangement upon the interior surface of the face or window of the tube body itself.

Figures 4, 5:
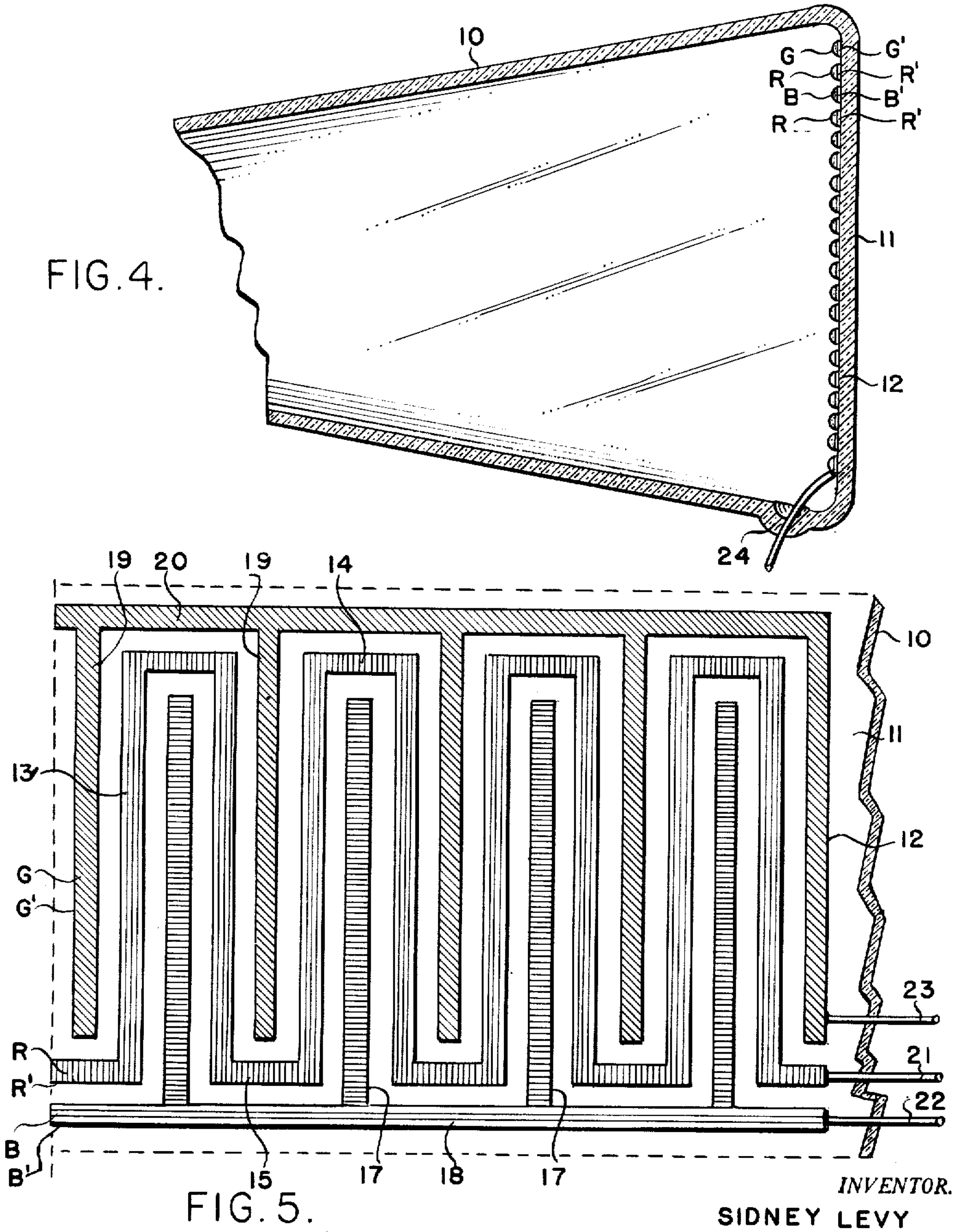
Figure 4 is a cross-section of the front end of a cathode ray tube in accordance with the present invention taken on a line parallel with the line scan.
Figure 5 is an exaggerated fragmentary view of the target screen pattern arrangement.

The target screen in accordance with the present invention is comprised of a foundation layer or coating of transparent conductive material such as, tin oxide or commercially designated NESA or EC coating which is arranged in accordance with the line pattern more particularly illustrated in Figure 1. Alternatively it may be narrow conductive metal strips substantially narrower than the phosphor strips deposited thereon. As will be seen from said figures, the pattern of the transparent conductive coating is arranged in the form of three independent groups or families of lines or strips, comprising grids R′, B′ and G′ which are mutually insulated from each other. Each of these groups or grids is comprised of a series of parallel spaced interconnected strips 12 which constitute the operative portions of the grids in so far as the visual image is concerned. The strip portions are illustrated in Figures 1, 4 and 5 as disposed vertically or at right angles with respect to the horizontal line scanning direction of the electron beam shown schematically by the broken horizontal line in Figure 4. It will be understood however that operative strip or line portions of the grids may be disposed parallel with the horizontal line scanning direction of the beam of the cathode ray tube, if desired. Grid R′ forming part of the composite foundation conductive pattern layer is comprised of a continuous sinuous line arranged so that the convolutions thereof form a series of spaced essentially vertical strips 13 extending across the tube face. The strips 13 are alternately integrally connected along their upper and lower ends as shown at 14 and 15 respectively. A second grid B′ of similarly disposed strips 16 comprises a comb-like pattern arrangement wherein the strips 17 of conductive material are interposed in the interstices between convolutions of the sinuous grid R′ along one side thereof. The strips 17 comprising the grid B′ are electrically connected to each other along one of their ends by means of essentially horizontal portion 18. Interposed between the convolutions of the sinuous grid R′ along the other side thereof is a similar comb-like grid arrangement G′ wherein the spaced strips of conductive material 19 are similarly disposed in the interstices between convolutions of the sinuous grid R′ along the other side thereof. Grid strips 19 are connected to each other along one of their ends by means of an essentially horizontal line or strip portion 20. Each of the groups or grids R′, B′ and G′ is connected to an associated electrode 21, 22 and 23 respectively which passes through suitable seals 24 in the tube envelope to provide suitable connecting terminals to associated control circuitry externally of the tube as will more clearly appear hereafter.

In retrospect therefore it will be seen that there are provided on the interior of the tube face three independent grid groups formed of strips or lines of conductive material, which grid groups are mutually insulated from each other; the members comprising each grid group being electrically interconnected with each other and each group being provided with an electrode terminal which passes through the tube envelope and permits the connection of a suitable source of control potential and associated circuitry. It will be noted that there are no cross-overs between the grid groups and lines or strips comprising them and that a vertical portion of the sinuous line R′ appears adjacent to each strip of the grid groups B′ and G′ so that there are as many strips formed in the pattern by grid R′ as in grids B′ and G′ combined. The purpose and advantage of this pattern arrangement will be more particularly pointed out hereafter.

It will of course be understood that the illustration of the target screen pattern is in exaggerated form for purposes of clarity and that the invention contemplates the employment of a large number of very thin closely spaced lines or strips in each grid; the spacing between adjacent strips being adequate to provide suitable insulation therebetween. The arrangement may be made to conform to a round tube face as in Figure 1 or may be made rectangular as in Figure 5.

The mosaic foundation pattern of transparent conducting material is advantageously formed by first depositing a coating of the transparent conductive material upon a transparent supporting plate in the form of a continuous layer by methods well known and described in the art; alternatively a metal layer can be deposited. A layer of photo-resist material is then deposited upon the conductive coating and exposed to light through a screen or film bearing the desired pattern. In the event that it is desired to form the conductive pattern upon the interior surface of the tube face, the layers of conductive and photo-resist material are deposited thereon and exposure to the light pattern is made through the front or exterior surface of the tube face. This can be done even with the metal film, provided that it is suitably thin and the appropriate light is used. Upon exposure and development of the exposed surfaces, the undesired portions of the conductive layer are etched away by a suitable etching solution thereby producing a mosaic or pattern of the conductive material having the above described configuration. Suitable electrical contacts are then made to the leads or electrodes for each grid group comprising the pattern as by the application of a conductive silver paint which when fixed becomes a metallic plate to which suitable electrodes or terminals may be connected.

Deposited upon the exposed surface or each grid group of conductive lines or strips is a sensitizing layer of phosphor or luminescent material capable of emitting light of a different color. Such material may be fluorescent or phosphorescent, the term luminescent material or phosphor being intended to include materials capable of emitting light upon the impingement of electrons thereon. These materials are well known in the art and are adequately described in the patented art and elsewhere. As stated, the sensitizing layer or phosphor deposited upon each of the grids is capable of emitting light of a different color which when activated in various proportions and viewed simultaneously produce a wide range of colors or hues including white. Thus as may be seen in Figures 1, 2 and 5 grid R′ has deposited therein a phosphor R capable of producing red light, grid B′ has deposited therein a phosphor B capable of producing blue light, and grid G′ has deposited therein a phosphor G capable of producing green light.

The deposition of the appropriate color phosphor upon the conductive grid line and strips may advantageously be accomplished by means of an electrostatic deposition process. In this method the appropriate phosphor powder is incorporated in a wax type base which is then reduced to powder form. This material is charged up by friction and deposited upon the screen or screen plate on which the selected color grid group of lines or strips is charged to a high potential. The electrified particles are thus caused to adhere to the selected grid group. This procedure is repeated with the other color phosphors by actuating the appropriate grid group in the conductive pattern. The temporary binder may then be baked off and replaced by a silicate binder. This method of phosphor deposition has the advantage that registration of each color phosphor with its appropriate transparent conductive grid is automatically achieved. Another method of phosphor deposition is by photographic means of Levy and Levine described in (Journal of Electrochemical Society, February, 1954). If the deposition is made upon an independent face plate, it may then be sealed into a tube provided with a standard gun whereupon it is sent through the normal cathode ray tube exhaust and activation process.

Figures 2, 3:
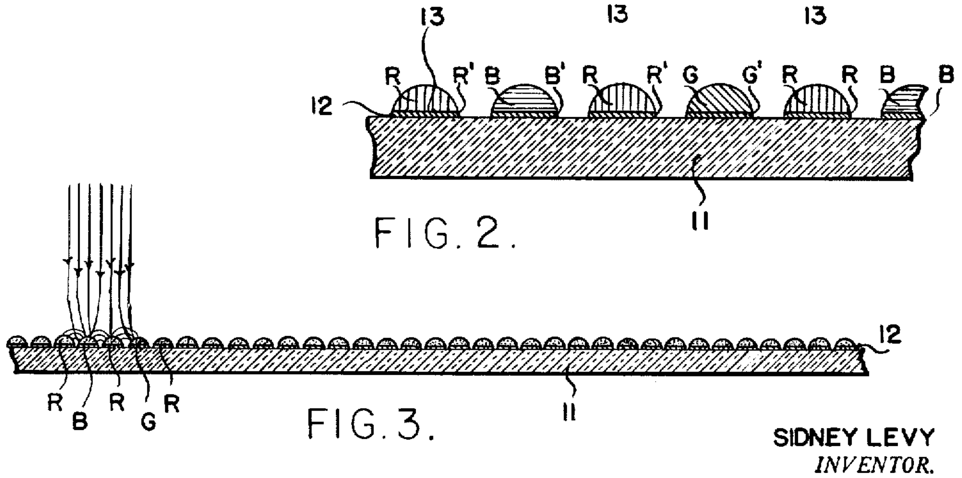
Figure 2 is a fragmentary cross-section of the tube face on an enlarged scale to show the pattern arrangement.
Figure 3 is a view similar to Figure 2 on a different scale illustrating the distribution of the electron beam diagrammatically.

As a result of the deposition of the color phosphor materials upon the foundation pattern of conductive material a color phosphor mosaic pattern of the character more clearly shown in Figures 2 and 5 is produced. It will be seen from said figures that there are twice as many operative strips bearing red phosphor as either of the other colors. This feature of the invention produces a mosaic pattern which compensates for the low luminescent efficiency of red phosphor materials.

Terminals 21, 22 and 23 of each of the transparent conducting grid group systems are connected to a suitable source of potential or anode voltage supply through a controlling circuit utilizing the chrominance or color portion of the television received signal, or any equivalent signal containing the desired color information. Thus, the potential level of each group of conducting strips is controlled by the respective color signal developed in the television receiving or similar apparatus. These controlling circuits are not shown in that they are well known in the art. It will also be understood that other signal devices or circuitry may be employed for impressing a suitable control potential upon each grid group of conductive strips. Thus for example in a simple arrangement each of electrodes may be connected to a source of anode potential supply means being provided to control the potential of each grid as by the interposition of a potentiometer. A selected color or hue may thereby be caused to appear over the entire tube surface area when scanned, as will be apparent hereafter. The application of such potentials to the grid groups of conductive strips result in the establishment of potential fields between adjacent operative portions of the conductive strips. The potential levels and field relationships between the strips is determined by the level of the related color signals applied to each grid. As a consequence of this an electron beam directed at the screen will be caused to be deflected toward the higher potential strips comprising the higher potential grids in accordance with the relative intensity of the potential field applied to each grid group of strips. This is particularly true if the electron beam when initially focused to a spot size on the target screen wherein the spot encompasses at least four strip lines which would therefore include two red strips, a green strip and a blue strip is caused to be deflected and to divide in accordance with the relative potential levels of each of the grids thereby resulting in the emission of light of a desired hue or color produced by the intermixture of these primary colors in these relative proportions. This effect is illustrated in Figure 3 which shows schematically the relative intensity of the local fields by means of the line designated 29 and the electron beam by the lines designated 24. Since the proportions of relative field intensities as between the primary color grids is similar over the entire screen area, the accurate registration of the electron beam with any particular point is no longer necessary so long as synchronization is maintained with the picture field scan as is normal in current television practice. Furthermore activation may be substantially limited to a selected primary color by increasing the relative potential level of the desired color grid to a point wherein substantially all of the electrons in the beam are deflected toward the particular selected primary color.

The overall intensity or saturation of the hues and colors may be controlled in the normal manner by a luminence or equivalent signal applied between the conventional grid and cathode of the electron gun which sets the overall intensity of the electron beam. It is therefore a significant feature of this invention that an arrangement is provided whereby fields are set up at the target screen which will deflect the majority of the electrons in the beam to the phosphor bearing grid group having the highest voltage applied thereto and which will proportion the beam in accordance with the relative potential levels applied as between the grid groups.

One method of control of the screen is by operating the grid group above the "sticking potential" i. e. the potential at which there are fewer secondary electrons emitted that primaries reaching the screen. The screen potential then tends to drop as the electrons "stick." Under these conditions the control elements can just control the rate of discharge of electrons from the screen and in that manner produce large potential differences between each group of grids. A relatively high degree of color control may thus be readily achieved. Another method of achieving control is by operating the three grids at substantially below anode potential.

From the foregoing it will be apparent that the provision of a transparent conductive foundation pattern of grids of the character above described upon the face plate of the tube permits the control of the electron beam without the interposition of any barriers, masks, wires or screens between the phosphor surfaces and the electron beam, thus resulting in the achievement of a maximum light emission from the phosphor materials. The interposition of the transparent conductive layer such as a tin oxide, NESA or EC coating does not materially effect the light transmitted through the tube face in view of the high light transmission characteristics of such coatings. Further advantages are achieved by the simplicity of the pattern of the conductive grid strip groups and the correlative phosphor mosaic pattern deposited thereon which lends itself to the formation and deposition of the pattern in a simple and efficient manner in situ, if desired. The elimination of cross-overs and light barriers is an additional significant feature, as is the effect that a pattern is provided wherein the light efficiency characteristics of red phosphors generally employed may be readily compensated for. The arrangement permits the use of a single gun tube and eliminates the necessity of accurate registration or orientation of the beam for color and thus avoids the associated circuitry and electrode structures heretofore required for that purpose.

Another advantage is that by maintaining the red strips at a constant potential and swinging the blue and green strips above and below this potential the three chrominance signals can be composed into an X and Y signal (i. e. signals giving the intercept of a line from the apices of the I. C. I. color triangle with the side). This composition may be done early enough in the receiver to effect an economy by eliminating the need for one of the color amplifiers.

I have here shown and described a preferred embodiment of my invention. It will be apparent, however, that this invention is not limited to this embodiment and that many changes, addition and modifications can be made in connection therewith without departing from the spirit and scope of the invention as herein disclosed and hereinafter claimed.

I claim:

1. A cathode ray image reproducing tube including a source of an electron beam and a fluorescent screen, said screen being comprised of a transparent plate, a plurality of groups of areas of mutually insulated conductive material mounted on said plate, each of said groups being provided with a coating of material capable of emitting light of different colors when excited by said beam, a common electrical connection for each group of areas, one of said conductive areas being arranged in the form of a sinuous line and a group of strips arranged in interlaced relation with said first group.

2. A cathode ray image reproducing tube including a source of an electron beam and a fluorescent screen, said screen being comprised of a transparent plate, a plurality of groups of areas of mutually insulated conductive material mounted on said plate, each of said groups being provided with a coating of material capable of emitting light of different colors when excited by said beam, a common electrical connection for each group of areas, one of said groups of conductive material being comprised of a grid formed of a sinuous line, a comb-like grid of interconnected strips positioned along each side thereof, the strips of said comb-like grids being interposed in the interstices between the convolutions of said sinuous line.

3. A cathode ray signal translating device including a source of an electron beam and a fluorescent screen enclosed within an envelope having a transparent face plate, a foundation layer of conductive material deposited on the interior surface of said face plate, said foundation layer being comprised of a grid work of strips of said conductive material arranged in mutually insulated groups, the member of each group being electrically interconnected, said fluorescent screen comprising a material capable of emitting light of a selected color when excited by said beam, deposited upon the surface of each of said grid groups, the relative number of strips comprising one grid group varying from the number of strips comprising any other group in accordance with the relative degree of emission desired from said groups.

4. A cathode ray signal translating device including a source of an electron beam and a fluorescent screen enclosed within an envelope having a transparent face plate, a foundation layer of conductive material deposited on the interior surface of said face plate, said foundation layer being comprised of a grid work of strips of said conductive material arranged in mutually insulated groups, the member of each group being electrically interconnected, said fluorescent screen comprising a material capable of emitting light of a selected color when excited by said beam, deposited upon the surface of each of said grid groups, one of said grid groups being comprised of a sinuous line.

5. A cathode ray signal translating device including a source of an electron beam and a fluorescent screen enclosed within an envelope having a transparent face plate, a foundation layer of conductive material deposited on the interior surface of said face plate, said foundation layer being comprised of a grid work of strips of said conductive material arranged in mutually insulated groups, the member of each group being electrically interconnected, said fluorescent screen comprising a material capable of emitting light of a selected color when excited by said beam, deposited upon the surface of each of said grid groups, one of said grid groups being comprised of a sinuous line, said sinuous line having deposited thereon a fluorescent material capable of emitting red light upon excitation by said electron beam.

6. A cathode ray signal translating device including a source of an electron beam and a fluorescent screen enclosed within an envelope having a transparent face plate, a foundation layer of conductive material deposited on the interior surface of said face plate, said foundation layer being comprised of a grid work of strips of said conductive material arranged in mutually insulated groups, the member of each group being electrically interconnected, said fluorescent screen comprising a material capable of emitting light of a selected color when excited by said beam, deposited upon the surface of each of said grid groups, one of said grid groups being comprised of a sinuous line, a comb-like grid group being positioned in interlaced relation with respect to said sinuous strip.

7. A cathode ray signal translating device including a source of an electron beam and a fluorescent screen enclosed within an envelope having a transparent face plate, a foundation layer of conductive material deposited on the interior surface of said face plate, said foundation layer being comprised of a grid work of strips of said conductive material arranged in mutually insulated groups, the member of each group being electrically interconnected, said fluorescent screen comprising a material capable of emitting light of a selected color when excited by said beam, deposited upon the surface of each of said grid groups, one of said grid groups being comprised of a sinuous strip, a comb-like grid goup positioned on either side of said sinuous grid, the strips thereof being interposed in the interstices between the convolutions of said sinuous grid.

References Cited in the file of this patent

UNITED STATES PATENTS

| | | |
|---|---|---|
| 2,307,188 | Bedford | Jan. 5, 1943 |
| 2,416,056 | Kallmann | Feb. 18, 1947 |
| 2,446,440 | Swedlund | Aug. 3, 1948 |
| 2,461,515 | Bronwell | Feb. 15, 1949 |
| 2,577,368 | Schultz et al. | Dec. 4, 1951 |

Notice of Adverse Decision in Interference

In Interference No. 87,900 involving Patent No. 2,714,175, S. Levy, Color television system and display therefor, final judgment adverse to the patentee was rendered September 3, 1957, as to claims 1, 2, 3, 4, 6, and 7.

[*Official Gazette October 1, 1957.*]